J. W. FULLER, Jr.
PULVERIZER MILL.
APPLICATION FILED MAR. 15, 1911.

1,039,721.

Patented Oct. 1, 1912.

4 SHEETS—SHEET 1.

WITNESSES:

INVENTOR:
J. W. Fuller Jr.
BY
ATTORNEYS.

J. W. FULLER, Jr.
PULVERIZER MILL.
APPLICATION FILED MAR. 15, 1911.
1,039,721.
Patented Oct. 1, 1912.
4 SHEETS—SHEET 2.
Fig. 2,
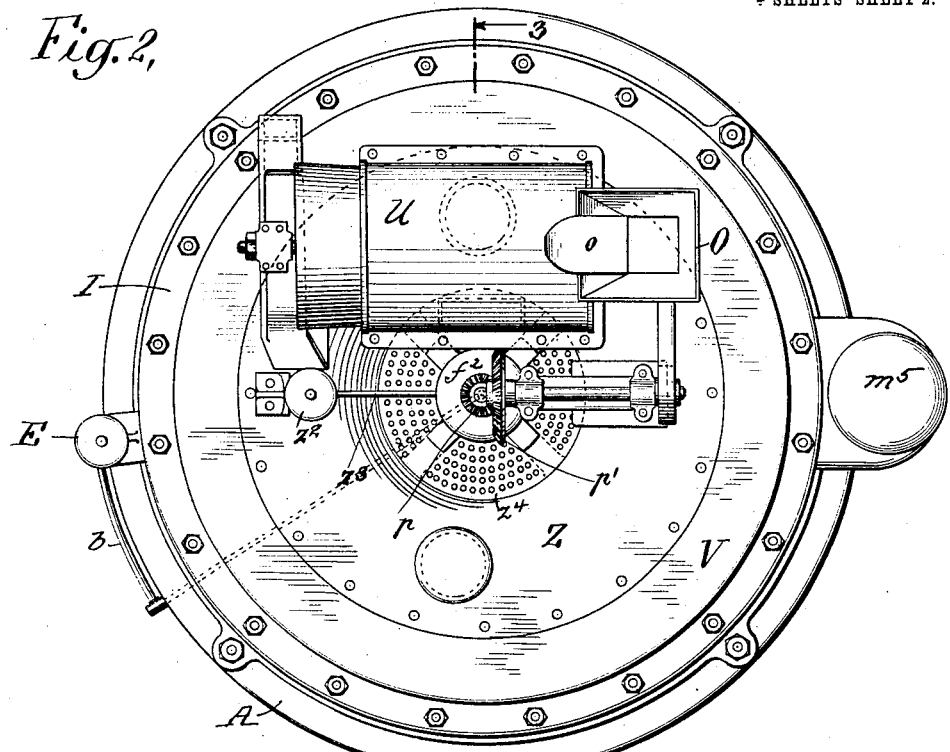
Fig. 3,
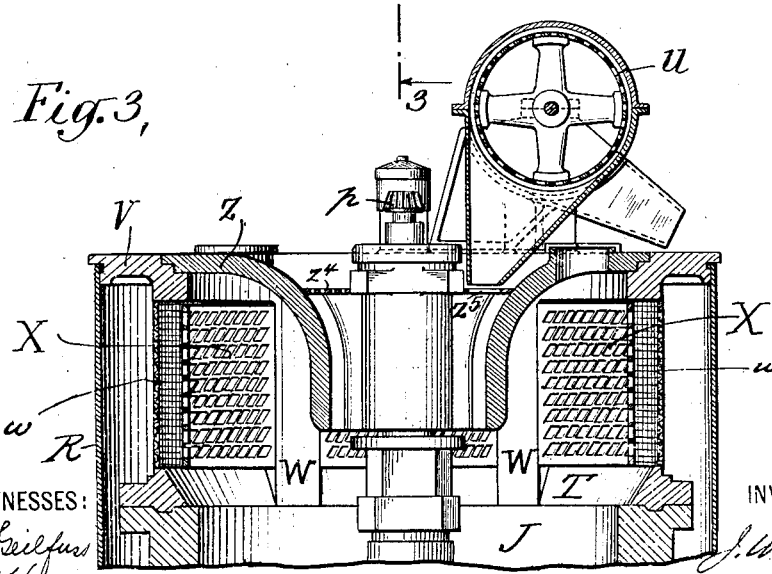
WITNESSES:
INVENTOR,
BY
ATTORNEYS.

J. W. FULLER, Jr.
PULVERIZER MILL.
APPLICATION FILED MAR. 15, 1911.

1,039,721.

Patented Oct. 1, 1912.
4 SHEETS—SHEET 3

WITNESSES:

INVENTOR:

BY

ATTORNEYS

J. W. FULLER, Jr.
PULVERIZER MILL.
APPLICATION FILED MAR. 15, 1911.

1,039,721.

Patented Oct. 1, 1912.
4 SHEETS—SHEET 4.

WITNESSES:

INVENTOR:
BY
ATTORNEYS.

UNITED STATES PATENT OFFICE.

JAMES W. FULLER, JR., OF CATASAUQUA, PENNSYLVANIA.

PULVERIZER-MILL.

1,039,721. Specification of Letters Patent. Patented Oct. 1, 1912.

Application filed March 15, 1911. Serial No. 614,618.

*To all whom it may concern:*

Be it known that I, JAMES W. FULLER, Jr., a citizen of the United States, residing at Catasauqua, county of Lehigh, State of Pennsylvania, have invented certain new and useful Improvements in Pulverizer-Mills; and I do hereby declare the following to be a full, clear, and exact description of the invention, such as will enable others skilled in the art to which it appertains to make and use the same.

My invention relates to certain new and useful improvements in mills for grinding and pulverizing cement, ore and other like materials, requiring to be finely reduced.

Figure 1:
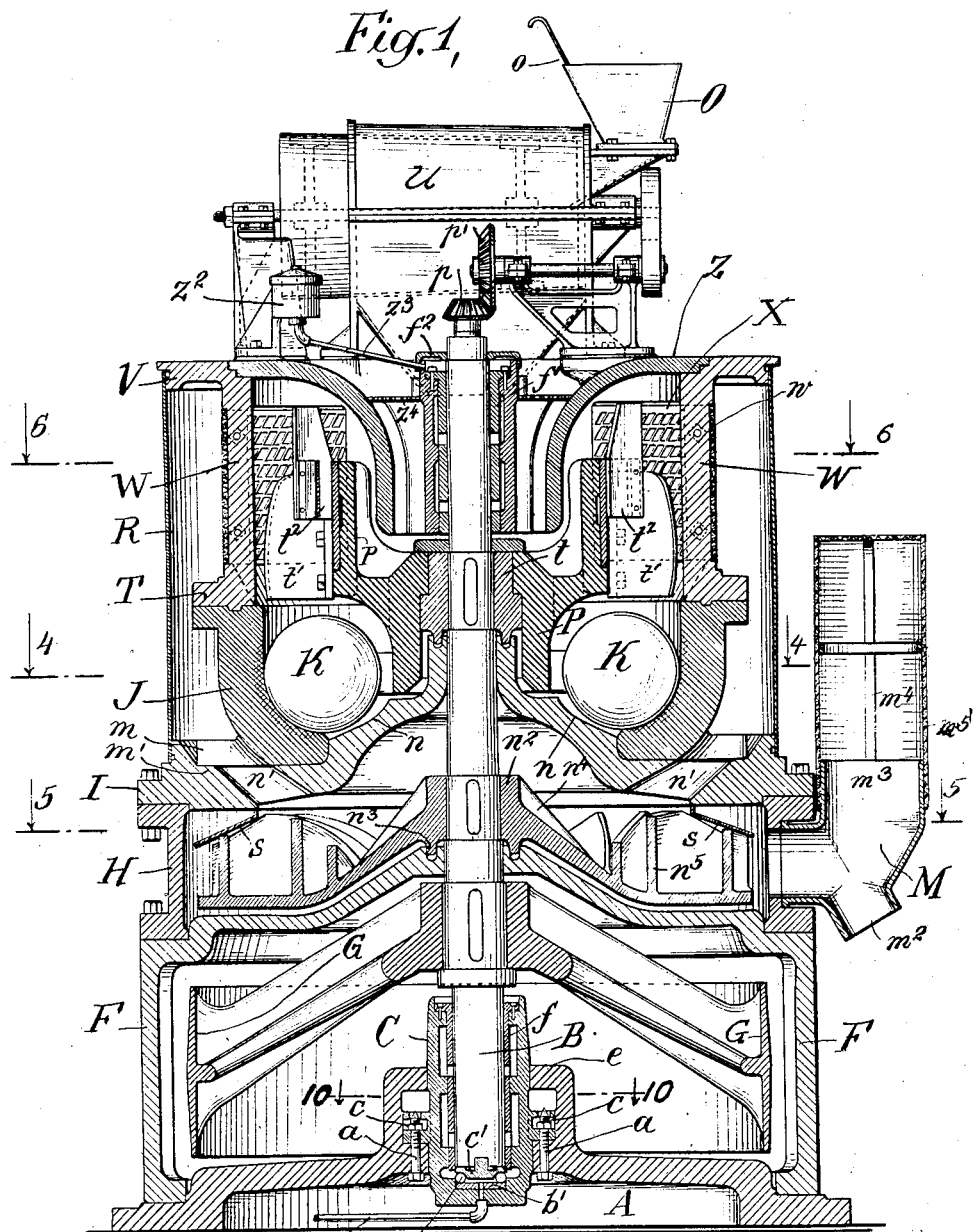
Figure 10:
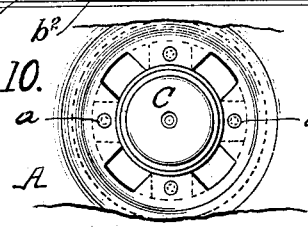
Figure 4:
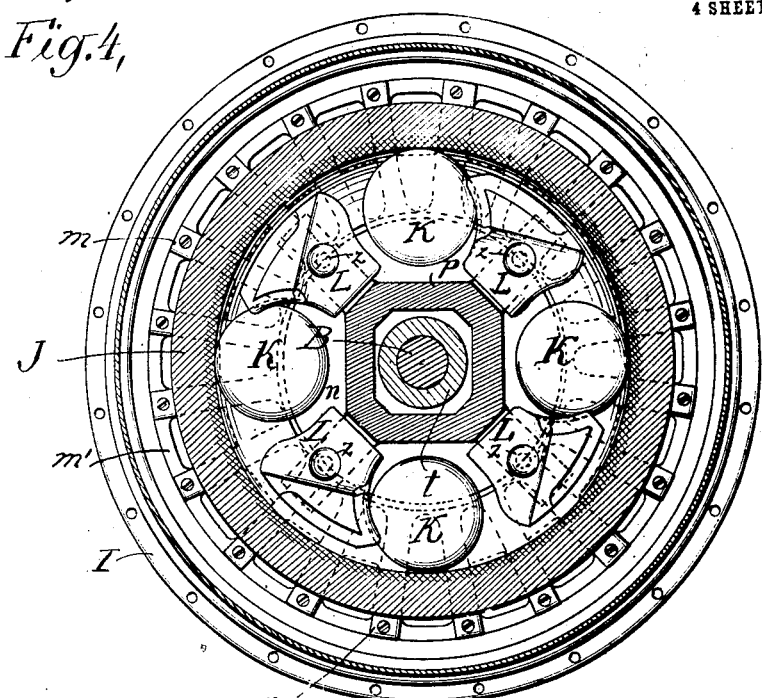
Figure 5:
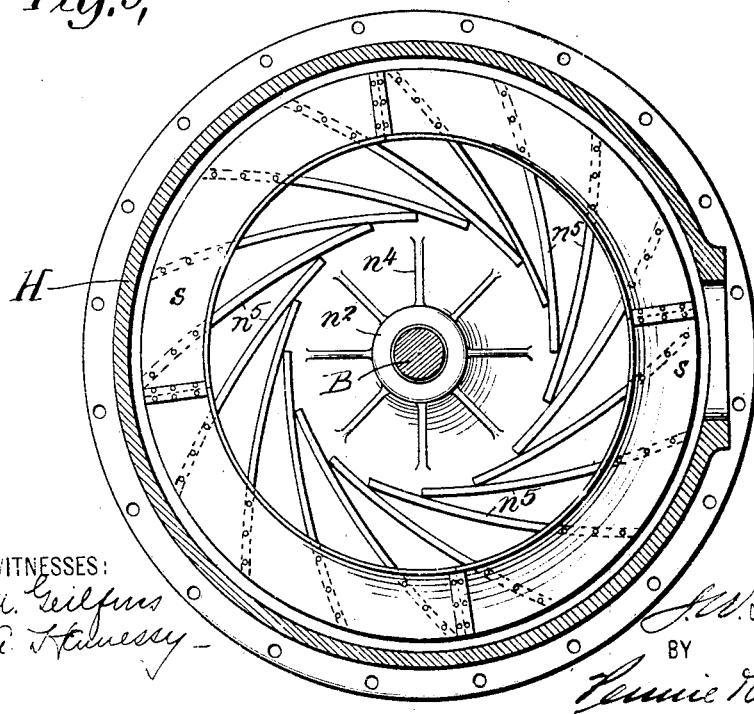
Figure 6:
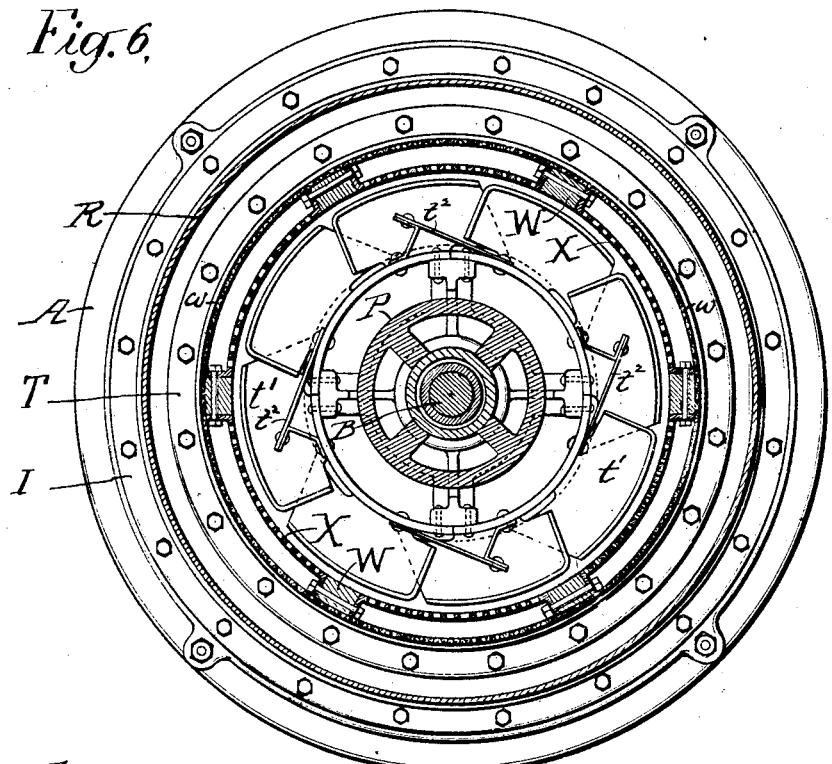
Figure 7:
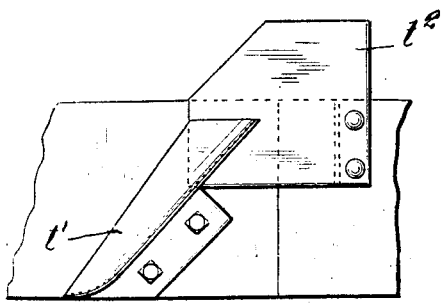
Figure 8:
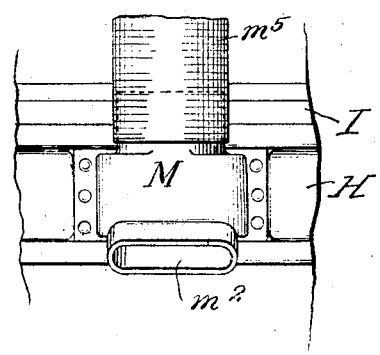
Figure 9:
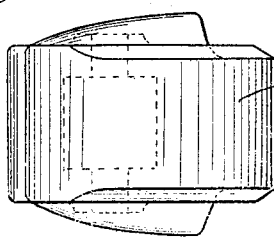

In the accompanying drawings, Figure 1 represents a vertical sectional view, partly in elevation, of a pulverizer mill embodying my improvements. Fig. 2 represents a top plan view thereof. Fig. 3 represents a vertical sectional view, partly in elevation, on the line 3—3 of Fig. 2, of the upper portion of the mill, certain of the parts being omitted, for clearness of illustration. Fig. 4 represents a cross sectional view on the line 4—4 of Fig. 1. Fig. 5 represents a cross sectional view on the line 5—5 of Fig. 1. Fig. 6 represents a sectional view on the line 6—6 of Fig. 1. Figs. 7, 8 and 9 represent, on a larger scale, certain details of construction. Fig. 10 is a detail section on line 10—10 of Fig. 1.

Similar letters of reference indicate similar parts throughout the several views.

Referring to the drawing, A represents the base plate or foundation plate upon which the superstructure is supported, and within which is mounted the bottom-bearing C for the vertical shaft or spindle B. The bearing C is provided with side lugs (four in number) having pockets $c$ within each of which a square nut is fitted, adapted to engage with a corresponding screw threaded bolt $a$, thereby locking the bearing to the base plate A.

Within the bottom-bearing C is fitted the bronze bushing $f$, having a top flange, as shown, which rests upon a corresponding inner shoulder of the bottom-bearing, the bushing being secured in place preferably by means of countersunk screws. Suitable passages are provided in the several internal flanges of the bearing and in the walls of the bushing, these passages communicating with a space in the lowermost part of the bearing, which space is in communication by means of a pipe $b$ with a suitable lubricator E (see Fig. 2) whereby a supply of lubricating oil may be furnished to the bearing. In the bottom of the recess referred to rests a perforated plate $b'$, which serves as a runway for the steel balls $b^2$, these balls acting as friction bearings between the plate $b'$ and the bottom plate $c'$, attached to and rotating with the vertical shaft or spindle B.

Upon the foundation plate A of the mill rests the casing F for the power driven pulley G, keyed to the shaft B. As indicated in Fig. 1, the casing F is provided with suitable side openings, of large dimensions, so that the driving belt for actuating the pulley may have free passage. Above the casing F is located the wall section H, which is bolted to the casing F and which is likewise bolted to a superjacent section I.

The section I supports the die J, having a chilled inner surface which serves as a trackway for the series of pulverizer balls of metal K. While the chilled surface of the die J constitutes the pulverizing face proper of the mill, nevertheless, the upper surface $n$ of the section I is likewise a grinding surface to some extent and much of the material that enters the mill will be subjected to attrition along this surface; so that it may be said that the die element of the mill really consists of two separate but related units, one of them (the die proper J) serving as a trackway for the pulverizer balls, and the other, (the cover of the section I along the surfaces $n$) serving as a means for holding the material to be pulverized. The die section J is provided with a series of feet $m$ which rest upon an annular shoulder $m'$ of the section I. These feet are bolted to the section I, and the interspaces between the feet are in free communication with a series of apertures $n'$ in the section I.

The apertures $n'$ communicate with a fan chamber, whose main body portion is contained within the section H and whose cover is formed by the section I, which is dome shaped, so as to give the required capacity for the chamber. Within the fan chamber is contained a fan, whose hub $n^2$ is keyed to the shaft. The hub $n^2$ is provided with a subjacent annular flange $n^3$ fitting a corresponding groove in the top of the casing F and it is likewise provided with a series of inclined ribs $n^4$. The fan blades $n^5$, as shown more clearly in Fig. 5, are substantially tangent at their inner ends to an imaginary circle, but have a slight curvature, as indicated, so as to assist them in subserving their functions. It will also be noted that the fan blades rise in a gradual curve from a point near the base of the central cone, of which the hub $n^2$ forms part, to the outer edge of the passages $n'$, so that the passages $n'$ discharge into the fan correspondingly. Beyond this region, the fan blades are provided with a sheet metal cover $s$, made up of a number of sections with butt joints covered by metal strips, this cover having a downward inclination, corresponding to a like dip of the fan blades at their outer portions. It is found that, by this construction, the fan will cause a strong and even down draft through the annular series of openings $n'$ and that it will discharge an even and sustained blast of dust-laden air through the exit opening of the section H. This exit opening is provided with a discharge spout M (shown in detail in Fig. 8), whose lower branch $m^2$ delivers the pulverized product of the mill and whose upper branch $m^3$ supports a frame $m^4$ of metal strips, which frame is designed to distend a bag of jute $m^5$ or other coarse fabric permeable to air; whereby the air automatically separates from the pulverized material with which it is laden and passes out through the interstices of the jute or like fabric. The fabric serves as a filter for any of the pulverized material that might tend to follow the escaped air, and, in some instances, a second bag of jute or the like may be superposed over the first, if a more complete or effective filtration is required for any particular conditions.

Upon the spindle B is keyed a sleeve $t$, having a subjacent annular flange fitting a groove of the section I. This hub $t$ carries the yoke P, provided at its lower portion with four arms which enter suitable pockets or recesses in the pushers L, being held in space thereon by the pins $z$, so that they may be removed at will for purposes of substitution or repair. As shown more fully in Fig. 9, the propelling faces of the pushers are made somewhat wider than the main body portion thereof, so as to give easy bearing, and they somewhat overlap the periphery of the pulverizer balls, as indicated more clearly in Fig. 4.

At its upper part, the yoke P is provided with a main series of blades $t'$, having a rearward and upward incline, as shown in Fig. 7, and with a series of upright blades $t^2$, which latter series is tangent to a common circle. The function of these blades is to raise the pulverized material and to float it out through the surrounding screen section (now to be described) aided by the exhaust action of the lower fan already referred to.

The screen section is provided with a base T and a top V connected by intervening posts W, thereby leaving intervening spaces which are occupied by the screen protectors X. These screen protectors X are of much coarser mesh than the screens proper and are intended to protect the finer texture of the screens proper from injury by the bombardment of any material of considerable size that might otherwise be projected against them by the action of the fans. The screens proper $w$, of fine mesh, lie outside of the screen protectors, as shown, and any material that has passed the screen protectors and is too large to pass through the screens proper will drop back by gravity into the die.

At its upper portion, the mill is provided with a depressed cover plate Z, within which fits a bushing $f'$ corresponding to the bushing $f$ of the bottom-bearing of the mill. The depressed cover itself constitutes a top-bearing within which the bushing $f'$ is secured, and a cap piece $f^2$ forms with the top bearing a recess for the reception of lubricating oil from the lubricator $z^2$, which communicates with said recess by the pipe $z^3$. A perforated partition $z^4$ closes the central opening of the cover plate Z and permits, at the same time, the drawing in of a quantity of air through said cover, to assist in the floating out of the pulverized material. This partition $z^4$ is provided with an opening $z^5$ (see Fig. 3) through which the graded material from the feed screen U enters the mill. The spindle B is provided with a gear $p$ which meshes with a gear $p'$, the ratio of transmission being such as to drive the feed screen at the speed desired. The hopper O of the feed screen may likewise be provided with a slide $o$, adjustable so as to vary the amount of material fed to the screen.

Outside of the screens $w$ of the upper section of the mill, the mill is incased with a sectional jacket or casing R of sheet metal, constituting an annular chamber in communication with the apertures $n'$ leading to the lower fan chamber.

The parts being arranged and constructed as described, the operation of the mill is as follows: The material to be pulverized is supplied at the grade and in quantity per unit of time desired, through the feed screen U. It drops down through the opening $z^5$ in the plate $z^4$ and through the central space of the depressed cover, into the die of the mill, which, in the meantime, has been set in motion. The material thus supplied is subjected to the crushing and pulverizing action of the steel balls, as hereinbefore described, and the suction action of the upper and lower fans coöperates to progressively remove the finely pulverized material from the trackway, as it is produced, raising it into the upper compartment of the mill and floating it out through the screen protectors and through the screen. This action is greatly facilitated by the entrance of air through the perforated plate $z^4$, and by the specific construction of the lower fan which causes an effective inflow of the air laden with the pulverized material through the openings $n'$. Finally, the air with its burden of pulverized material is expelled into the discharge spout $m$, the pulverized material dropping through the branch $m^2$, and being collected in any suitable receptacle, and the air separating and passing upwardly and outwardly through the interstices of the filter of jute fabric $m^5$.

Having thus described my invention, what I claim is:

1. In a pulverizer mill, a die section consisting of a trackway and a series of pulverizer balls coöperating with the trackway to pulverize the material supplied to the mill, a subjacent incline for receiving the material to be pulverized and supplying it to the trackway, in combination with a fan chamber located above the die and in direct communication therewith, a fan chamber located below the die and in communication with the upper chamber, and fans contained in both fan chambers; substantially as described.

2. In a pulverizer mill, a die section consisting of a trackway and a series of pulverizer balls coöperating with the trackway to pulverize the material supplied to the mill, a subjacent incline for receiving the material to be pulverized and supplying it to the trackway, in combination with a fan chamber located above the die and in direct communication therewith, a fan chamber located below the die and in communication with the upper chamber, fans contained in both fan chambers, and a screen interposed between the two fan chambers, substantially as described.

3. In a pulverizer mill, a die section consisting of a trackway and a series of pulverizer balls coöperating with the trackway to pulverize the material supplied to the mill, a subjacent incline for receiving the material to be pulverized and supplying it to the trackway, a fan located below the die section and a chamber within which said fan rotates, said chamber being in communication with the die, and a screen interposed between the die and the fan chamber, substantially as described.

4. In a pulverizer mill, a die, pulverizer balls coöperating therewith, a fan located above the die, a fan chamber within which said fan rotates, a screen through which the pulverized material raised by the fan is floated, a fan chamber below the die and in communication with the fan chamber above the die, and a fan contained within said lower fan chamber, said fan consisting of a series of blades tangent at their inner ends to a common circle; substantially as described.

5. In a pulverizer mill, a die, pulverizer balls coöperating therewith, a fan located above the die, a fan chamber within which said fan rotates, a screen through which the pulverized material raised by the fan is floated, a fan chamber below the die and in communication with the fan chamber above the die, and a fan contained within said lower fan chamber, said fan consisting of a series of blades tangent at their inner ends to a common circle, said blades being inclined outwardly and rearwardly to a point beyond the inlet for the air from the upper chamber, and being provided beyond that point with a cover plate; substantially as described.

6. In a pulverizer mill, a die, pulverizer balls coöperating therewith, a fan located above the die, a fan chamber within which said fan rotates, a screen through which the pulverized material raised by the fan is floated, a fan chamber below the die and in communication with the fan chamber above the die, and a fan contained within said lower fan chamber, said fan consisting of a series of blades tangent at their inner ends to a common circle, said blades being inclined outwardly and rearwardly to a point beyond the inlet for the air from the upper chamber, and being provided beyond that point with a cover plate, said cover plate being downwardly inclined; substantially as described.

7. In a pulverizer mill, an upper screen section, provided with a cover, depressed at its central portion to form a downwardly depending bearing projecting into the screen section, and provided with a bushing for the upper part of the shaft of the mill; substantially as described.

8. In a pulverizer mill having a screen through which the pulverized material is ejected from the milling chamber by an ejecting fan operating within said chamber, an exhaust fan located outside of said chamber and said screen, and serving to supplement the expelling action of the ejecting fan in passing the pulverized material through said screen and from the mill; substantially as described.

9. In a pulverizer mill having a screen through which the pulverized material is ejected from the milling chamber by an ejecting fan operating within said chamber, a fan chamber communicating with said milling chamber through said screen and an exhaust fan operating in said fan chamber, which exhaust fan has the capacity to aid in expelling the pulverized material from the milling chamber through said screen and from the mill by way of said fan chamber; substantially as described.

10. In a pulverizer mill having a screen through which the pulverized material is ejected from the milling chamber by a fan on the main shaft operating within said chamber, a fan chamber concentric with said milling chamber and separated therefrom by said screen, and an exhaust fan within said fan chamber and on said main shaft, the capacity of which exhaust fan permits it to aid in expelling the pulverized material from the milling chamber through said screen and from the mill by way of said fan chamber, substantially as described.

11. In a pulverizer mill, the combination of a milling chamber having a raceway and pulverizer balls within its lower part, a cylindrical screen inclosing said chamber above said raceway and balls, and a fan operating within said chamber and provided with inclined vanes for lifting the pulverized material from said raceways and other tangential vanes for projecting it radially through said screen; substantially as described.

12. In a pulverizer mill, the combination of a milling chamber having a raceway and pulverizer balls within its lower part, a cylindrical screen inclosing said chamber above said raceways and balls, a cover-plate having a central downwardly directed chute extending within said chamber, a shaft bearing located within and encompassed by said chute, and a fan operating between said screen and said chute; substantially as described.

13. In a pulverizer mill, the combination with a milling chamber partially inclosed by a screen, of an exhaust fan chamber subjacent to said milling chamber, an annular chamber encompassing said milling chamber and communicating therewith through said screen, and inwardly and outwardly inclined passages affording communication between said annular chamber and the central part of said exhaust fan chamber; substantially as described.

14. In a pulverizer mill, the combination of a dome-shaped exhaust fan chamber, a dome-shaped exhaust fan mounted in said exhaust fan chamber and provided with tangential blades, a milling chamber having a domed bottom covering said exhaust fan chamber, an annular chamber encompassing said milling chamber and communicating therewith through a screen, and downwardly and inwardly inclined passages leading from the bottom of said annular chamber to the central part of said exhaust fan chamber; substantially as described.

In testimony whereof I affix my signature in presence of two witnesses.

JAMES W. FULLER, Jr.

Witnesses:
JOHN C. PENNIE,
FRANK A. HENNESSY.